United States Patent
Heinonen et al.

(10) Patent No.: US 6,764,576 B1
(45) Date of Patent: Jul. 20, 2004

(54) METHOD AND AN APPARATUS FOR FORMING AND THERMOSEALING PACKAGING CONTAINERS

(75) Inventors: Esko Heinonen, Eslöv (SE); Mats Nyhlén, Lund (SE); Mikael Andersson, Tving (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/889,511
(22) PCT Filed: Jan. 27, 2000
(86) PCT No.: PCT/SE00/00163
§ 371 (c)(1), (2), (4) Date: Sep. 4, 2001
(87) PCT Pub. No.: WO00/44619
PCT Pub. Date: Aug. 3, 2000

(30) Foreign Application Priority Data

Feb. 1, 1999 (SE) ............................................. 9900330

(51) Int. Cl.[7] .............................. B65B 7/20; B65B 3/02
(52) U.S. Cl. ................... 156/379.7; 156/443; 53/376.3; 53/377.7; 53/377.8; 53/378.3; 53/DIG. 2; 493/126; 493/127; 493/133; 493/135; 493/184; 493/452
(58) Field of Search ............................. 156/227, 272.2, 156/272.4, 379.7, 443; 53/467, 476, 477, 484, 491, 268, 285, 376.3, 377.7, 377.8, 378.3, DIG. 2; 493/121, 126, 127, 133, 135, 162, 183, 184, 452

(56) References Cited

U.S. PATENT DOCUMENTS

| | | | | |
|---|---|---|---|---|
| 2,979,995 A | * | 4/1961 | Bergstein et al. | ............ 493/131 |
| 3,699,743 A | * | 10/1972 | King et al. | ............... 53/565 |
| 3,879,247 A | * | 4/1975 | Dickey | .................... 156/272.4 |
| 4,145,236 A | * | 3/1979 | Neumayer et al. | ......... 156/73.1 |
| 5,488,812 A | | 2/1996 | Stark et al. | |
| 5,809,743 A | * | 9/1998 | Ylonen et al. | ............. 53/370.6 |
| 5,966,899 A | | 10/1999 | Fontanazzi | |

FOREIGN PATENT DOCUMENTS

EP 0 217 282 4/1987

* cited by examiner

*Primary Examiner*—Jeff H. Aftergut
*Assistant Examiner*—John T. Haran
(74) *Attorney, Agent, or Firm*—Burns, Doane, Swecker & Mathis, L.L.P.

(57) ABSTRACT

The disclosure relates to a method and an apparatus for forming and thermosealing one end of a packaging container which is manufactured from thermosealing material. The packaging container is placed in a conveyor which brings it into contact with mechanical forming devices (22) which progressively reform the packaging container end so that a sealing fin (6) oriented in the direction of movement of the packaging container is formed. In a subsequent sealing station (12), thermoplastic material located in the sealing fin (6) is heated to sealing temperature, whereafter wall portions included in the sealing fin are mechanically urged against one another during simultaneous cooling and continued advancement.

6 Claims, 5 Drawing Sheets

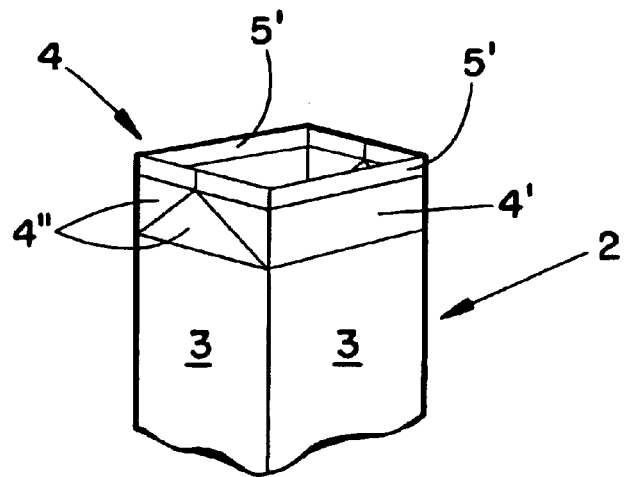
Fig. 1A
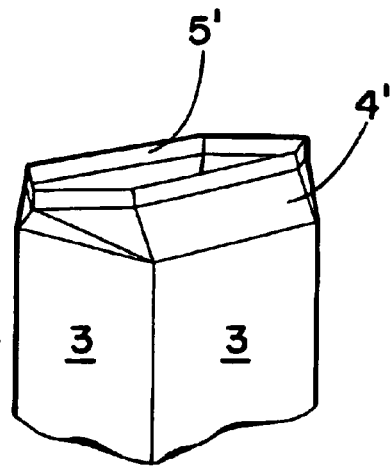
Fig. 1B
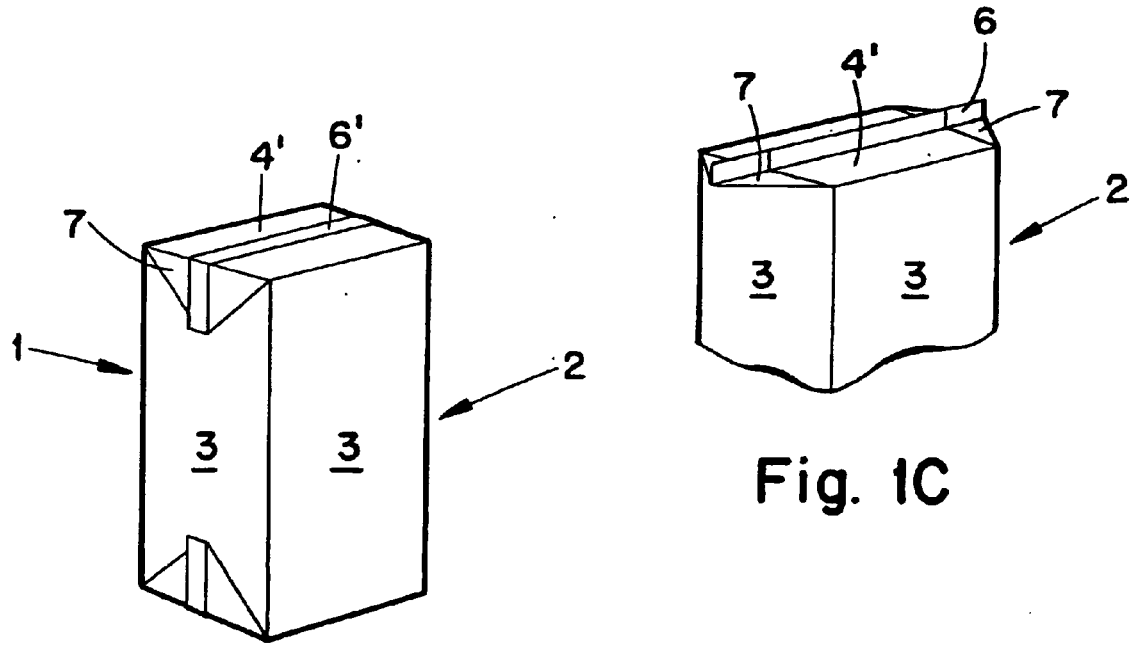
Fig. 1C
Fig. 1D

METHOD AND AN APPARATUS FOR FORMING AND THERMOSEALING PACKAGING CONTAINERS

FIELD OF THE INVENTION

The present invention relates to a method for forming and thermosealing one end of a packaging container comprising layers of thermosealable material, the packaging container being displaced by means of a conveyor through a forming station and a sealing station.

The present invention also relates to an apparatus for forming and thermosealing one end of a packaging container which is displaced by means of a conveyor through a forming station and a sealing station.

BACKGROUND OF THE INVENTION

Consumer packages for liquid contents such as milk or juice have long been known in the art and occur in numerous different types and sizes. The packaging containers are normally manufactured from a laminated material which comprises layers of fibrous material, e.g. paper, as well as layers of thermoplastic which not only render the packaging laminate liquid-tight but also make for thermosealing thereof. The laminate may also include additional layers, for example layers of gas barrier material such as aluminium foil (Alifoil) for further improving the properties of the laminate in protecting and keeping the product packed in the packaging container in pristine condition.

In a common type of packing and filling machine which is described in European Patent 217.282, a semi-manufacture is utilised in the form of tubular, flat-laid packaging container blanks. The blanks are provided in a per se known manner with a longitudinal seal as well as a pattern of crease lines in order to make for reforming of both ends of the blank into an end portion (top and bottom portion, respectively). Normally, the prefabricated, flat-laid blank is raised so that it obtains a square or rectangular cross-sectional configuration, whereafter it is provided, by folding and sealing of end wall panels located at the one end of the blank and defined by means of crease lines, with a liquid-tight bottom. With the aid of a conveyor, the blank provided with a bottom is thereafter displaced to a filling station in which it is supplied with the desired quantity of suitable contents, e.g. milk. After completed filling, the thus filled blank is displaced an additional step to a subsequent sealing station in which the upper end of the blank (after possible additional forming) is sealed together in a liquid-tight transverse seal. In the forming operation, triangular corner flaps occur for reasons of geometry, and the flaps may be folded outwards or inwards and fixed in place in a suitable manner.

The above-described procedure takes place in conventional machines, normally as an intermittent process, i.e. the conveyor stepwise displaces the different packaging containers between the stations for bottom forming/sealing, filling and top forming/sealing. Since each packaging container, in the instant of processing, is located in a stationary, accurately fixed position, processing and sealing may take place with the aid of intermittently operating, reciprocating processing tools. Normally, conventional sealing jaws are employed in this connection for thermosealing, the jaws reciprocating in a direction substantially transversely in relation to the direction of movement of the conveyor. In certain types of machines, preforming of the ends of the packaging container blank takes place partly during the movement of the conveyor up to the sealing stations, e.g. with the aid of rotary or fixed forming devices. For example, use is occasionally made of guides converging seen in the direction of movement of the conveyor in order to urge the end wall panels subsequently forming the end wall of the blank in a direction towards one another as a preparatory step to the actual final forming and sealing.

The striving to produce packing or filling machines operating at high output capacity has entailed increasingly faster conveyor speeds and shorter stay-times in the different processing stations. However, in stepwise advancement of the conveyor, a limit is soon reached at which the contents, in particular if they are of low viscosity such as, for example, milk or juice, begin to slosh out of the packaging containers in connection with the jerking stepwise advancement movement. Attempts to adapt the acceleration and retardation speeds of the conveyor to meet the viscosity of the contents have entailed certain improvements, but in order to ensure a further increased machine capacity, it is necessary to depart from the intermittent conveyor movement and provide the machine with a continuously operating conveyor running at constant speed. This in turn renders impossible the employment of stationary processing tools which reciprocate transversely in relation to the conveyor. As a result, there is a general need in the art to realise a method of forming and thermosealing packaging containers in continuously moving containers, regardless of whether these are moved at varying or constant speed.

SUMMARY OF THE INVENTION

One object of the present invention is to realise a method of forming and thermosealing one end of a packaging container while the packaging container is fed, without stopping, through a processing station, e.g. a station for forming or sealing of the end portion of the packaging container.

A further object of the present invention is to realise a method of forming and thermosealing one end of a packaging container, the method being suitable for use in continuous advancement of packaging containers in relation to fixed processing stations.

Yet a further object of the present invention is to realise a method of forming and thermosealing one end of a packaging container, the method making for considerably increased production speed as compared with prior art methods.

Still a further object of the present invention is finally to realise a method of forming and thermosealing one end of a packaging container, the method not suffering from the limitations and drawbacks inherent in prior art, similar methods.

These and other objects have been attained according to the present invention in that the method described by way of introduction has been given the characterizing features that the conveyor displaces the packaging container through the forming station in contact with mechanical forming devices which progressively reform the packaging container end until such time as opposing walls thereof meet one another in a sealing fin oriented in the direction of movement of the packaging container, whereafter the conveyor further displaces the packaging container end in between sealing devices disposed in the sealing station which heat thermoplastic material located in the sealing fin to sealing temperature, whereafter wall portions included in the sealing fin are mechanically urged against one another during simultaneous cooling and continued advancement.

There is also a need in the art to realise a machine for the continuous part production of packaging containers in accordance with the above-disclosed method, i.e. a machine in which a continuously running conveyor displaces packaging containers through sequentially disposed processing stations, e.g. stations for forming and thermosealing of an end portion of a packaging container.

One object of the present invention is to realise an apparatus for forming and thermosealing one end of a packaging container which continuously moves through stations for forming and sealing.

A further object of the present invention is to realise an apparatus for forming and thermosealing one end of a packaging container, the apparatus making it possible to process continuously moving packaging container blanks, i.e. packaging container blanks advanced by means of a conveyor.

Yet a further object of the present invention is to realise an apparatus for forming and thermosealing one end of a packaging container, the apparatus including stationary forming and sealing devices.

Still a further object of the present invention is to realise an apparatus for forming and thermosealing one end of a packaging container, the apparatus lacking intermittently moving parts.

Yet a further object of the present invention is finally to realise an apparatus for forming and thermosealing one end of a packaging container, the apparatus—despite simple and economical design and construction—making for a packaging or filling machine with considerably increased capacity compared with prior art, intermittently operating machines.

The above and other objects have been attained according to the present invention in that an apparatus of the type described by way of introduction has been given the characterizing features that the forming station includes a mechanical forming device which is disposed along the conveyor a distance therefrom, as well as sealing devices disposed in the sealing station, the sealing devices similarly extending along the conveyor a distance therefrom and being disposed to heat a sealing region of the packaging container, and also compression devices disposed after the sealing devices and disposed to mechanically compress the heated wall portions so that these, after cooling, are sealed to one another in liquid-tight fashion.

The method and the apparatus according to the present invention thus make possible, through their continuous operational mode, a packing and filling machine with a continuously running packaging conveyor, which entails not only a considerably higher output capacity but also smoother operation and reduced wear compared with packing and filling machines of prior art type in which both the packaging conveyor and the processing tools move intermittently.

BRIEF DESCRIPTION OF THE DRAWINGS

One preferred embodiment of both the method and the apparatus according to the present invention will now be described in greater detail hereinbelow, with particular reference to the accompanying, schematic Drawings which show only those parts and details essential to an understanding of the present invention. In the accompanying Drawings:

FIGS. 1A–1D are schematic perspective views of an upper portion of a per se known packaging container during forming and sealing in accordance with the method according to the present invention;

DETAILED DESCRIPTION OF THE INVENTION

Figure 2:
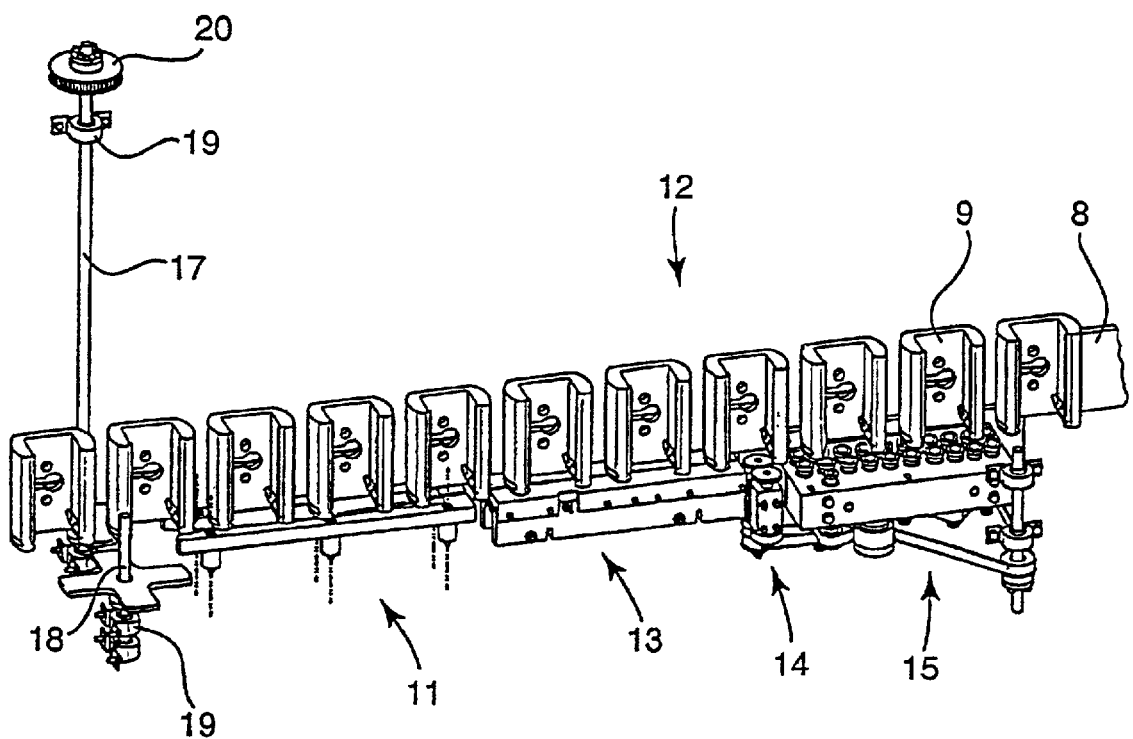
FIG. 2 is a perspective view of the apparatus according to the present invention.

The method and the apparatus according to the present invention are intended to form and thermoseal at least one end of a per se known packaging container 1 which, in its final form, is substantially parallelepipedic or brick-shaped. Packages of this or similar type are common for packing different types of products such as, for example, milk or juice, but also for packing highly viscous or semi-solid products, for example puddings or cheese. The packaging containers are typically manufactured from a laminated packaging material which includes layers of fibrous material, e.g. paper, as well as thermoplastic and aluminium foil (Alifoil). The thermoplastic layers preferably surround the fibrous layer and cater for the liquid-tightness properties of the packaging container. Moreover, the thermoplastic makes it possible to thermoseal packaging material to itself or to other thermoplastic materials. The Alifoil ensures the material's gas barrier and light barrier properties and also makes possible inductive heating of the laminate, e.g. in connection with sealing.

FIG. 1A shows the upper portion of a packaging container blank 2 which is manufactured from a packaging laminate which is of the previously described type, which is provided with a crease line pattern, and which includes four pairwise parallel side wall panels 3 and also end wall panels 4 located at their upper and lower ends. Only the end wall panel 4 located at the upper end at the packaging container blank 2 is visible in FIG. 1, but it is assumed that the opposing, lower end of the packaging container 1 may be of the same type as the upper end, or be designed in any other optional previously known manner. The end wall panels 4 include, on the one hand, two opposing, rectangular end wall panels 4' (main panels), and on the other hand substantially triangular end wall panels 4" (folding panels) located between them. At the upper end of the end wall panel 4 facing away from the side wall panels 3, there is a sealing panel 5 extending around the circumference of the packaging container blank 2. When the packaging container 1 is ready-formed, i.e. when the end wall panels 4 and sealing panels 5 of the packaging container blank 2 have been folded together for the formation of a substantially planar end wall, the two substantially rectangular main panels 4' together form the actual end wall surface over which the mutually sealed sealing panels 5 extend as a transverse sealing fin 6. The triangular folding panels 4" are folded together to flat-laid, substantially triangular corner flaps 7 which have been folded down and connected to two opposing side wall panels 3. The end portions of the sealing fin 6 extend over the downwardly folded corner flaps 7.

FIGS. 1B and 1C show the progressive reforming of the packaging container blank 2 into a finished packaging container 1. In FIG. 1B, the reforming operation has been commenced in that the downward folding of the end wall panels 4 has begun and the sealing panels 5 have been brought closer to one another. In FIG. 1C, the sealing panels 5 are in contact with one another and can be sealed together for the formation of the sealing fin 6, at the same time as the triangular end wall panels 4" have been united for the formation of the opposingly located, flat-laid corner flaps 7 which, however, have not yet been folded down and sealed to the side wall panels 3 of the packaging container 1.

The method and the apparatus according to the present invention are intended to cater for the above-described, per se known reforming and sealing of the end wall of the packaging container blank 2 (FIGS. 1A—1C) in a continuous and rational manner. In order to carry this into effect, use is made of the apparatus illustrated in FIG. 2, which includes a conveyor 8 in the form of a flexible or jointed belt which carries a number of sequentially disposed cassettes 9 for accommodating the packaging container blanks 2. The cassettes 9 may be of any optional configuration, but preferably are of U-shaped cross section and suitably include means (not shown) for fixing the packaging container blank 2 in the desired axial position in the cassette 9. In this position, at least the one (lower) end portion of the packaging container blank 2 will extend outside the lower defining surface of the cassette 9, i.e. the end wall panels 4 and the sealing panels 5 will be accessible for processing outside the lower end of the cassette 9. The conveyor 8 moves continuously and preferably at uniform speed from left to right in FIG. 2, the cassettes passing in sequence a preforming assembly 10 for preforming the one end portion of the packaging container blank 2, a forming station 11 for progressively reforming the end portion of the packaging container blank 2 and uniting together the sealing panels 5 into the fin 6, as well as a sealing station 12 for liquid-tight sealing together of the end wall. The sealing station 12 includes, in sequence, a sealing device 13 for the inductive heating of the laminate layers included in the sealing fin 6, a pressure device 14 for compressing and sealing together the sealing panels 5 included in the fin 6, and a support device 15 for maintaining compression pressure on the fin 6 until such time as the sealing operating has been completed. Each one of these stations included in the apparatus according to the present invention will now be described in greater detail.

Like other parts of the apparatus, the various processing stations are carried in a per se known manner by a frame (not shown) which also supports the remaining machine parts which are not illustrated in the Drawings but are conventional, such as electric motors, drive shafts, belts and other mechanical or electric units. The processing stations are disposed linearly after one another along a straight section of the conveyor 8 which, with the aid of the cassettes 9, continuously displaces the packaging container blanks 2 from left to right in FIG. 2. The lower end surface of the cassettes 9 is located a few millimeters' distance above the adjacent parts of the stations. By guiding the cassettes in this manner past the different stations, the end wall panels 4 and sealing panels 5 projecting out of the lower parts of the cassettes will be in contact with the different processing parts of the forming stations and can, as a result, during progressive displacement through the stations, be reformed into a packaging container end wall of the desired final form (FIG. 1C).

Figure 3:
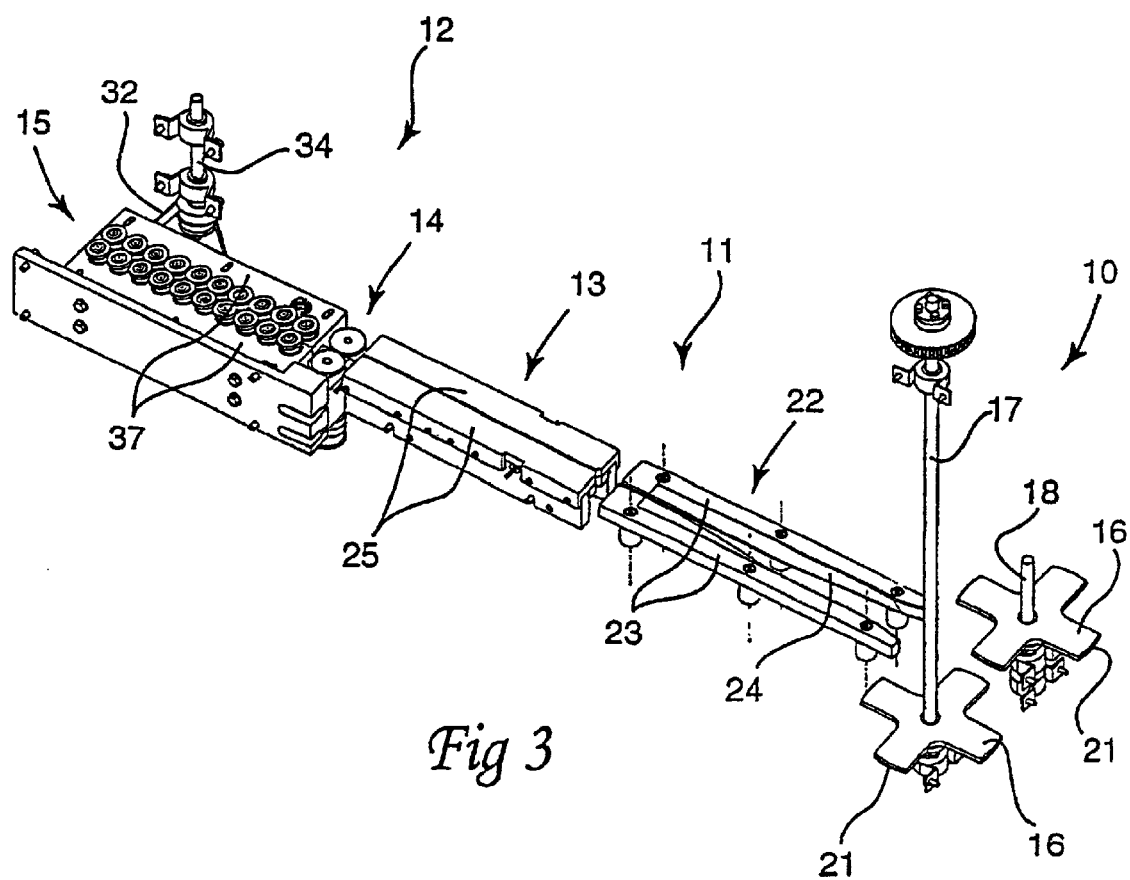
FIG. 3 shows parts of the apparatus of FIG. 2 in another perspective.

The preforming assembly 10 is first in the row of processing stations seen in the direction of movement of the conveyor 8. The preforming assembly 10 is, like the other processing stations included in the apparatus according to the present invention, fixedly connected to and carried by a frame (not shown). The preforming assembly 10 includes rotary squeezers 16 which are located in register with one another and symmetrically in relation to the conveyor 8, as well as being carried by drive shafts 17, 18. The drive shafts 17 and 18 are supported by journals 19 of conventional type which are fixedly connected to the frame (not shown). The drive shafts 17 and 18 further each carry their belt pulley 20 which, by means of a belt (not shown), is connectable to one or more prime movers of known type. In such instance, the squeezers 16 may be rotated via the belt pulleys 20 in opposite directions, i.e. such that the registering parts of the squeezers 16 move substantially in the same direction as the conveyor 8. Each squeezers 16 is in the form of a cross through which the drive shaft 17, 18 extends in the centre of the cross. The ends of the arms of the cross display gently curved work surfaces 21 which coincide with an imaginary circle extending around each squeezers 16 and whose diameter coincides with the distance between two opposing work surfaces 21. The distance between the two squeezers 16, i.e. the distance between the temporarily mutually facing work surfaces 21, is less than the distance between two opposing main end panels 4' when these are located in a plane with adjacent side wall panels 3 (FIG. 1A). An imaginary centre line for the various processing stations further extends centrally between the above-mentioned opposing work surfaces 21 on the two squeezers 16, as is apparent from FIG. 3.

Figure 4E:
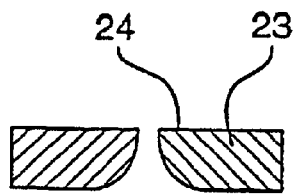
FIGS. 4A–E show mutually subsequent cross sections through folding rails in the apparatus according to the present invention.
Figure 4D:
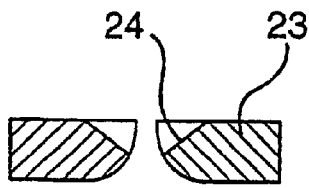
Figure 4C:
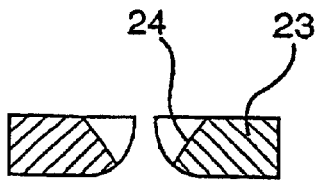
Figure 4B:
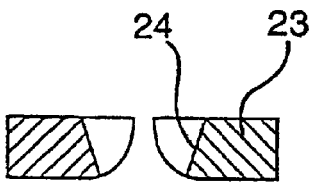
Figure 4A:
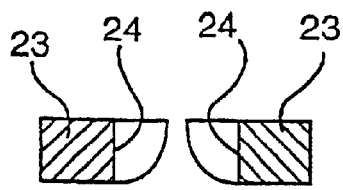

After the preforming assembly 10, there follows the forming station 11 which includes a forming device 22 extending along the conveyor 8. More precisely, the forming device 22 includes two mutually parallel folding rails 23 each with their work surface 24 whose orientation varies along the length of the forming device 22. As will be apparent from FIGS. 4A–E, which show repeated cross sections distributed uniformly over the length of the folding rails 23, the work surfaces 24 at the intake end of the folding rails 23, i.e. the end located most proximal the preforming assembly 10, are substantially parallel with the longitudinal axis of a packaging container 1 advanced by the conveyor 8. In other words, the work surfaces 24 are parallel with one another and are disposed mutually spaced apart a distance which substantially corresponds with the distance between the mutually facing work surfaces 21 on the squeezers 16. Seen in the direction of movement of the cassettes 9, the inclination of the work surfaces 24 thereafter progressively changes so that, midway along the folding rails, these are located substantially at an angle of 45° to the above-mentioned plane (FIG. 4C). At the final end of the folding rails, i.e. at the end facing towards the subsequent sealing station 12, the work surfaces 24 are located in a common horizontal plane (FIG. 4E) which is located immediately adjacent (1–2 mm) the lower surface of the cassettes. Between the two folding rails, there now remains only an interspace which is equal to or slightly exceeds the total thickness of the wall portions included in the sealing fin 6.

Figure 5:
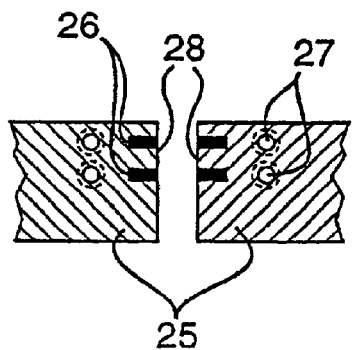
FIG. 5 is a cross section through parts of inductors in the apparatus according to the present invention.
Figure 6:
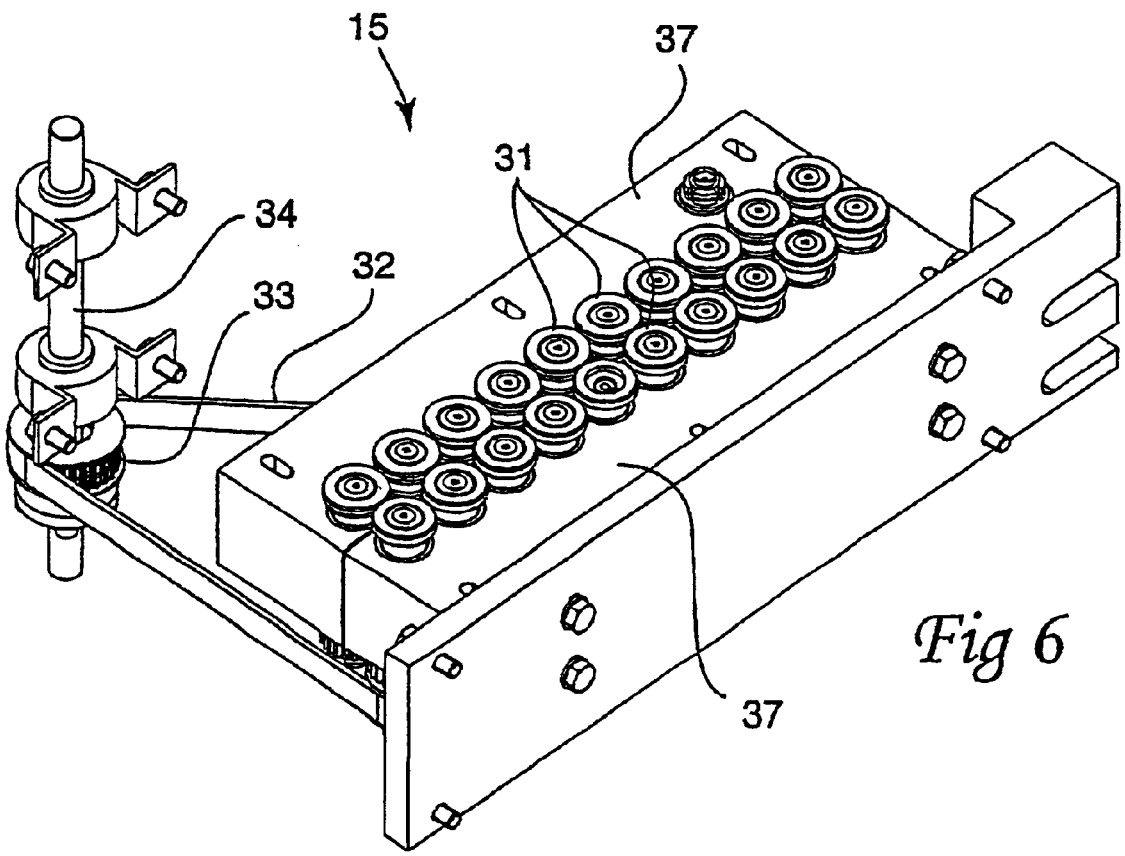
FIG. 6 shows, in perspective and on a larger scale, a part of the sealing station according to the present invention.

A distance after the forming device 22 of the forming station 11, there is disposed the sealing device 13 of the sealing station 12. This is also disposed linearly in relation to the remaining sealing stations and the conveyor 8. The sealing device 13 includes two inductors 25 disposed on either side of the centre of the conveyor 8 and fixedly connected to the frame (not shown), being mutually mirror-reversed and also disposed a distance from each other (FIG. 5). As will be apparent from the cross section through parts of the two inductors 25 illustrated in FIG. 5, each inductor includes a coil (not shown) with two parallel conductors 26, as well coolant ducts 27 located behind them. The conductors are, in a conventional manner, connectable to a current source (not shown), and are intended for induction heating of the layer of aluminium foil located in the sealing panels 5 of the packaging container blank 2. The distance between the two work surfaces 28 of the inductors 25 facing towards one another is slightly greater than the total thickness of the sealing panels 5 included in the sealing fin 6, which ensures that inductive heating of the sealing fin can actually take place. This technique is per se well known in the art and is not likely to need any detailed description in this context.

Figure 7:
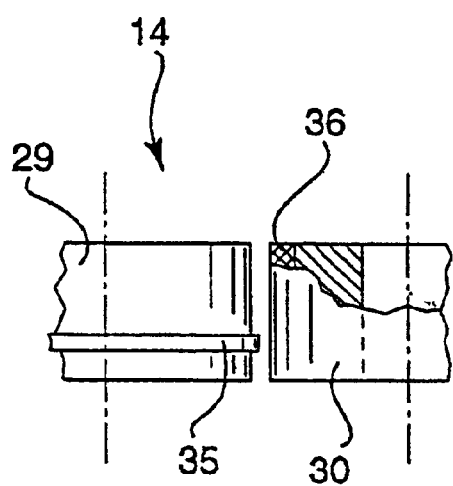
FIG. 7 shows, on a larger scale, a part of two compression rollers according to the present invention.

The sealing station 12 also includes a pressure device 14 disposed after the sealing device 13, the pressure device 14 displaying two cooperating pressure rollers 29 and 30. The pressure rollers 29 and 30 are driven, like support rollers 31 located in subsequent support devices 15, by means of a cogged belt 32 which, by the intermediary of a belt pulley 33 and a drive shaft 34, are connectable to a per se known electric drive motor (not shown). The pressure rollers 29 and 30 are supported by mutually parallel shafts which are similarly parallel with the longitudinal axis of the packaging container blank 2 located in the cassettes 9. As will be apparent from FIG. 7, the one pressure roller 29 (which is manufactured from a hard material, such as stainless steel) includes a projecting flange or ridge 35 which is located one or a few millimeters higher than the surrounding cylindrical work surface of the pressure roller 29. The cooperating pressure roller 30 is cylindrical throughout its entire height but displays a surface layer 36 of flexible material forming its work surface, e.g. rubber. The distance between the work surface of the pressure roller 29 and the surface layer 36 consisting of rubber on the pressure roller 30 is substantially equal to or slightly less than the total thickness of the sealing panels 5 included in the sealing fin 6. The distance between the part of the work surface of the pressure roller 29 which is carried by the flange 35 and the flexible surface layer 36 on the pressure roller 30 is considerably less and amounts to substantially only approximately 1 mm. Like, for example, the squeezers 16, the two pressure rollers 29 and 30 are driven in opposite directions of rotation, i.e. so that their temporarily mutually facing parts of the work surface move in the same direction as the cassettes 9 conveyed by means of the conveyor 8 past the pressure rollers 29 and 30.

After the pressure device 14, seen in the direction of movement of the conveyor 8, the sealing station 12 displays the support device 15 with the previously mentioned support rollers 31 which are disposed in two parallel rows along the path of movement of the conveyor 8. The support rollers 31 are carried by mutually parallel shafts (not shown) which are freely rotatably journalled in two mutually parallel reel holders 37 located adjacent one another. At the opposite side of the reel holders which is not visible, the shafts of the support rollers 31 display belt pulleys which, with the aid of the previously mentioned cogged belt 32, may be driven in opposite directions so that the work surfaces of the support rollers 31 facing towards one another move in the direction of movement of the conveyor 8. The distance between the work surfaces of the support rollers 31 included in the two rows is slightly less than the total thickness of the sealing fins 6 of the packaging containers. The support rollers 31 are manufactured from, or display a surface layer of a relatively flexible material, e.g. rubber.

As will have been apparent from the foregoing description, the apparatus according to the present invention includes a number of processing stations disposed in line with each other which, on operation of the apparatus, sequentially act on end portions of the packaging container blanks 2 projecting from the cassettes 9. More precisely, in accordance with the method according to the present invention, a packaging container blank 2 which is carried by any optional cassette 9 will, in its one end portion, be reformed from the appearance illustrated in FIG. 1A to the appearance illustrated in FIG. 1C, i.e. the end portion of the packaging container blank is closed and sealed in liquid-tight fashion in the sealing fin 6. When one end of a packaging container is to be formed and thermosealed in accordance with the present invention, a packaging container blank 2 is, as was previously mentioned, first placed in one of the cassettes 9 of the conveyor 8. In such instance, the packaging container blank 2 is oriented such that its one end projects outside the lower end region of the cassette 9. More precisely, the end portion extends substantially along the side wall panels 3, which implies that the end wall panels 4 and sealing panels 5 extend down beneath the cassette 9 and will be freely accessible for processing when the relevant cassette is displaced with the aid of the conveyor 8 from left to right in FIG. 2. In such instance, the packaging container blank 2 first arrives at the preforming assembly 10 which rotates at substantially the same peripheral speed as the linear speed of the conveyor 8. The two mutually cooperating work surfaces 21 will then, on rotation of the squeezers 16, come into contact with a front portion of the opposing main end panels 4' of the packaging container blank 2 which, because of the distance between the two work surfaces 21 will, in such instance, be actuated in a direction towards one another. More precisely, the two main end panels 4' will be folded towards one another around a substantially horizontal fold line located between the main end panels 4' and adjacent side wall panels 3. At the same time, the triangular folding panels 4" will be forced outwards so that the sealing panels 5' bordering on the two main end panels 4" can approach one another, as is illustrated in FIG. 1B, When the packaging container blank 2, with the aid of the preforming assembly 10, has been reformed in the above-described manner, the projecting end portion is, on the continued displacement of the conveyor 8, led in between the two folding rails 23 of the forming device 22, whereupon the mutually parallel work surfaces 24 of the folding rails come into contact with the main end panels 4' at their upper edge regions adjacent the sealing panels 5. The progressively changing inclination of the work surface 24 of the folding rails 23 here entails a progressive converging of the main end panels 4' until such time as the sealing panels 5 abut against one another and together form the sealing fin 6. The sealing fin 6 is now displaced with the aid of the conveyor 8 further to the sealing station 12 and, more precisely, in between the two inductors 25 of the sealing device 13 which have been activated in that the conductors 26 have been connected to the previously mentioned current source (not shown). In such instance, a magnetic alternating current is generated around the conductors 26 which, by cooperation with the layer of aluminium foil included in the packaging laminate, entails an inductive heating of the aluminium foil layer in those parts of the sealing panels 5 which are to be sealed to one another. When the sealing fin 6 of the relevant packaging container 1 has passed along the entire length of the inductors 25, the heating of the aluminium foil has resulted in adjacent parts of the thermoplastic layers of the packaging laminate being heated to sealing temperature (in, e.g. polypropylene approximately 160–170° C.) so that a thermosealing of the thermoplastic layers included in the sealing panel 5 to each other is made possible.

The packaging container 1 is thereafter moved from the sealing device 13 to the pressure device 14 where, more precisely, the projecting sealing fin 6 (now heated to sealing temperature) runs in between the two mutually cooperating pressure rollers 29, 30. The sealing panels 5 included in the sealing fin 6 are now compressed against one another so that the heated thermoplastic layers at the inside of the packaging container are caused to fuse together. A particularly concentrated compression takes place with the aid of the flange 35 of the pressure roller 29, which further reduces the free distance between the work surfaces of the pressure rollers 29 and 30. The force of this compression is regulated by a suitable selection of the flexible surface layer 36 on the compression roller 30. In such instance, it will be ensured that a liquid-tight, well-compacted seal is obtained along the part of the sealing fin 6 facing towards adjacent main end panels 4', which guarantees a liquid-tight seal. After the sealing-together, the contact pressure is maintained between the now mutually united thermoplastic layers facing towards one another at the inside of the sealing fin 6 with the aid of the support rollers 31 which, during the continued transport of the relevant packaging container 1, surround the sealing fin 6 and ensure that the sealing panels 5 included in this fin continue to be urged against one another at suitable abutment pressure until such time as the heated thermoplastic layers have once again cooled and the seal is completed. In such instance, the mutual cooperating rotation of the support rollers 31 contributes in the as yet still warm sealing fin 6 being subjected to uniform compression and advancement without the sealing panels 5 included in the sealing fin 6 being exposed to any mutual movement which would weaken the resultant seal. When the sealing fin 6 has passed the support rollers 31, the cooling of the sealing fin 6 has continued for such a length of time that the mutually interconnected thermoplastic layers have once again hardened and thereby formed the desired, liquid-tight and strong bonding of the sealing panels 5 included in the fin 6. After discharge from the support rollers 31 of the support device 15, an additional forming processing of the packaging container 1 takes place in a per se known manner in order to fold down the flat said corner flaps 7 with associated parts of the sealing fin 6 and to seal these to the outside of the packaging container. However, this is a per se known technique and forms no germane part of the present invention.

With the aid of the method and the apparatus according to the present invention, it will thus be possible, during continuous displacement of the packaging container blanks 2, to realise a forming and thermosealing of the one or both of the end portions of the packaging container 1. This makes for a considerably increased working speed compared with prior art similar machines which normally operate with stepwise advancement of one or more packaging containers. The design and construction according to the present invention are also considerably simpler and thereby both more economical and more reliable, since they include but few moving parts and moreover totally lack moving parts executing a reciprocating movement.

What is claimed is:

1. An apparatus for forming and thermosealing one end of a packaging container which is displaced by means of a conveyor through a forming station and a sealing station, wherein the forming station includes a mechanical forming device which is disposed along the conveyor a distance therefrom, as well as sealing devices disposed in the sealing station, the sealing devices similarly extending along the conveyor a distance therefrom and being disposed to heat a sealing region of the packaging container, and also compression devices disposed after the sealing devices and disposed to mechanically compress the heated wall portions so that these, after cooling, are sealed to one another in liquid-tight fashion;

wherein the forming device includes a folding rail extending along the conveyor, with a work surface which, seen in the direction of movement of the conveyor, is commenced in a first orientation and terminated in a second orientation which differs 90° from said first orientation, and wherein the first orientation is parallel with the longitudinal axis of a packaging container advanced by the conveyor.

2. The apparatus as claimed in claim 1, wherein the forming device includes two folding rails which progressively reform the packaging container end until such time as opposing walls thereof meet one another in a sealing fin and which are provided with counter-facing work surfaces which, at their final end, display a mutual interspacing which is equal to or slightly exceeds the total thickness of the wall portions included in the sealing fin of the packaging container.

3. The apparatus as claimed in claim 1, wherein the sealing device includes an inductor for inducing a heating magnetic field in a layer of conductive material included in the laminate.

4. The apparatus as claimed in claim 3, wherein an inductor is located at each side of the path of movement of an end portion of a packaging container advanced by means of the conveyor.

5. The apparatus as claimed in claim 1, wherein a mechanical preforming assembly is disposed ahead of the forming device seen in the direction of movement of the conveyor.

6. The apparatus as claimed in claim 5, wherein the preforming assembly includes two counter-rotating squeezers disposed on either side of the conveyor with peripheral mutually facing work surfaces which are driven in the direction of movement of the conveyor and at the same speed as the conveyor.

* * * * *